UNITED STATES PATENT OFFICE.

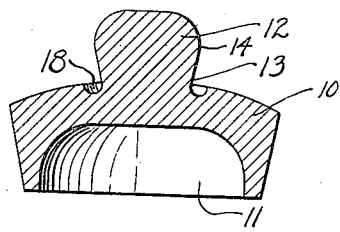
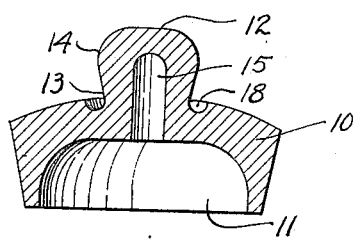
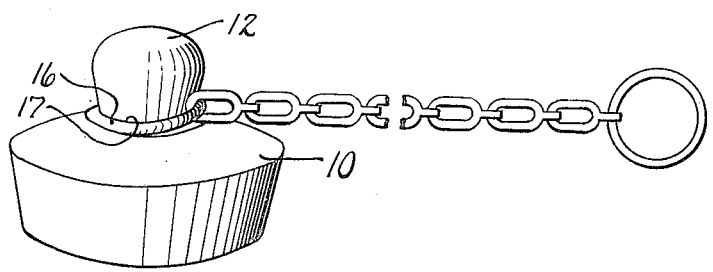

NATHAN BECKER, OF NEW YORK, N. Y.

DRAIN-PLUG.

1,384,038.

Specification of Letters Patent.

Patented July 12, 1921.

Application filed March 19, 1921. Serial No. 453,683.

*To all whom it may concern:*

Be it known that I, NATHAN BECKER, a citizen of the United States, and a resident of the borough of Bronx, city of New York, county of Bronx, and State of New York, have invented certain new and useful Improvements in Drain-Plugs, of which the following is a specification.

My invention relates to drain plugs for use in stopping the drain outlets of wash basins, wash tubs and the like.

According to my invention, the plug is molded from rubber composition and is provided with an upwardly extending knob, comprising an enlarged head and a neck portion connecting the head with the body of the plug; and the chain is secured to the plug by passing the head of the knob through the ring on the end of the chain.

In the accompanying drawing, Figure 1 is a vertical cross-sectional view of one form of device embodying my invention. Fig. 2 is a similar view of a modification, and Fig. 3 is a perspective view of a plug with a chain in place thereon.

The body 10 of the plug is of any preferred form, and is preferably provided with a recess 11 on its under side to save material and to make the plug conform more readily to the drain opening, but such recess may be dispensed with, if desired.

The knob 12 is preferably molded integrally with body 10 and comprises the relatively narrow neck 13 and the relatively enlarged head 14. The knob may be solid, as in Fig. 1, or may be hollow, having the recess 15 therein as shown in Fig. 2. Recess 15 may be of various forms other than as shown.

The chain ring 16 is secured to the plug by passing it forcibly over the head 14 of knob 12, which is compressed in putting the ring in place. The diameter of the hole 17 in ring 16 is preferably about the same as the outer diameter of neck 13, and is substantially less than that of head 14, so that when the ring is in place, as shown in Fig. 3, the plug is securely attached to the chain. If desired, the ring can, of course, be opened to put it in place and it can be closed again when in place, but this is not necessary.

If desired, an annular recess 18 may be provided in the body 10 about the base of neck 13 in which the ring 16 may be received. This is not essential but imparts an improved appearance to the device.

The device of my invention has several features of great practical advantage. There is no opening through the plug, so that leakage through the plug is impossible. The ring is secured direct to the molded composition and no metallic member passing through the plug is required for attaching the ring, and this results in a substantial saving. The ring is not passed through any part of the plug or projection thereon, so that there is no possibility of a part of the plug being torn apart or destroyed when subjected to a hard pull, as may happen when the ring is passed through a part of the plug or projection thereon. The cost and trouble of assembly is reduced to a minimum as all the assembly involves is pushing the chain ring over the head of the knob. The plug can be readily grasped by the knob and used without the chain, if desired.

It is to be understood that changes and modifications may be resorted to within the scope of my claims without departing from the principle or spirit of the invention.

I claim:

1. A drain plug of compressible molded rubber composition comprising a body portion and a knob integral with the body portion and having a relatively enlarged head and relatively narrow neck, a ring through which said head is adapted to be passed by compression of the head, said ring encircling said neck, and a chain attached to the plug by passing the ring forcibly over the compressible head.

2. A drain plug of compressible molded rubber composition comprising a body portion and a knob integral with the body portion and having a relatively enlarged head and a relatively narrow neck, the body portion having an annular recess therein about said neck, a ring through which said head is adapted to be passed by compression of the head, said ring encircling said neck and received in said annular recess, and a chain secured to said ring whereby the chain is attached to the plug by passing the ring forcibly over the compressible head.

In testimony that I claim the foregoing, I have signed my name hereto.

NATHAN BECKER.